United States Patent [19]

Mette

[11] Patent Number: 4,596,063
[45] Date of Patent: Jun. 24, 1986

[54] DEVICE FOR DELIVERING PORTIONS OF A DOUGHY SUBSTANCE

[75] Inventor: Manfred Mette, Hamburg, Fed. Rep. of Germany

[73] Assignee: Nordischer Maschinbau Rud. Baader GmbH & Co KG, Lubeck, Fed. Rep. of Germany

[21] Appl. No.: 712,004

[22] Filed: Mar. 14, 1985

[30] Foreign Application Priority Data

Mar. 15, 1984 [DE] Fed. Rep. of Germany ....... 3409517

[51] Int. Cl.$^4$ ............................................. A22C 11/04
[52] U.S. Cl. ...................................................... 17/37
[58] Field of Search ........................................ 17/37, 49

[56] References Cited

U.S. PATENT DOCUMENTS 3,883,925  5/1975  Muller ...................................... 17/33
3,922,755 12/1975  Righele et al. .......................... 17/33

Primary Examiner—Willie G. Abercrombie
Attorney, Agent, or Firm—Thomas R. Morrison

[57] ABSTRACT

The invention concerns a device for delivering portions of uniform weight and/or volume, e.g. of sausage stuffing. Starting from known conveyors of the vane pump, worm and axial piston type used for this purpose a radial piston conveyor modified according to the invention is suggested which delivers portion volumes proportional to the angle of rotation of the rotor by controlling the radial pistons via a controlling cam formed as an involute.

12 Claims, 2 Drawing Figures

DEVICE FOR DELIVERING PORTIONS OF A DOUGHY SUBSTANCE

BACKGROUND OF THE INVENTION

1. Field of the Invention

The invention concerns a device for delivering portions of uniform weight and/or volume of a pasty or doughy substance, in particular sausage meat or stuffing, the device comprising a housing having a supply and a discharge opening and a rotor fitting snugly within the housing and driven to rotate therein, which rotor has at least one pair of pistons, which are arranged radially displaceable within the rotor by supporting against a stationary controlling cam.

2. Description of Prior Art

A device of this type constructed as a supplementary apparatus is known from DE-PS No. 27 25 636. This device comprises conveying means which consist of a housing driven to rotate about a filling tube, in which housing there are two portioning chambers opposing each other diametrically. In each portioning chamber a piston is arranged to lie freely, which piston is supported by means of a roller on the inner surface of a controlling cam formed by a ring body. The controlling cam is arranged to be adjusted in its eccentricity with respect to the axis of the filling tube. The latter is interrupted by a separation wall effecting the separation of the filling tube into one part serving the supply and another part serving the discharge of the filling substance. Such filling substance fed under the pressure of the supply channel thus fills the portioning chamber connected to the supply channel, respectively, the contents of the portioning chamber then being delivered on the continuing rotation of the housing as a portion wholly or partially, depending on the set eccentricity through the discharge of the filling tube.

In this process the volume of the single portions can, at a maximum, only correspond to the volume of a portioning chamber obtainable when setting the maximum possible stroke of the eccentric. If smaller portions are handled it is disadvantageous that the portioning chambers are not emptied completely so that non-exchangeable remainder volumes of the filling substance remain in the portioning chambers.

A portioning device known from DE-AS No. 21 21 006 is limited in use in a similar manner and is disadvantageous with respect to its function. This device shows conveying means provided with a rotor having a double-effective stroke piston mounted to slide radially therein. This stroke piston is guided in a centre of rotation arranged eccentrically to the axis of rotation of the rotor by means of a sliding block guided in the stroke piston, the eccentricity being adjustable.

3. Object of the Invention

It is therefore a main object of the invention to suggest a portioning device having conveying means working according to the principle of a radial piston pump and being of compact structural size.

It is a further object of the invention to suggest a portioning device enabling the continuous production of equal portions of voluntary volume in a simple manner.

It is another important object of the invention to suggest a portioning device enabling the complete emptying of the portioning chambers.

SUMMARY OF THE INVENTION

In a device comprising a housing having a supply opening and a discharge opening and a rotor fitting snugly in the housing and being driven to rotate therein, the rotor having at least one pair of pistons which are arranged radially displaceable within the rotor by supporting against a stationary controlling cam, these objects are achieved according to the invention in that at least a section of the controlling cam controlling the ejection movement of the pistons is shaped such that the ejection of the substance volume occurs proportionally to the angle of rotation of the rotor.

Such conveying means can be manufactured very simply and offer the possibility of controlling the volume flow merely by a detection of the angle of rotation of the rotor. Thus, the conveying characteristic curve of the uneconomical, expensive and large known vane conveyors with cam controlled sliding blades, worm conveyors and axial piston conveyors such as normally used in this field of the art is obtained with the measure according to the invention. In the case of providing the conveying means with pistons controllable independently of each other the return movement of the pistons can be performed by means of a curved path for the purpose of improving the filling of the portion chambers, which path causes an exponentially increasing return movement with respect to the angle of rotation of the rotor.

An essential simplification results, however, if opposing pairs of pistons are connected rigidly with each other, because in this manner only one controlling cam is necessary which controls the stroke of the ejection movement of the displacer pistons, which controlling cam will effect simultaneously the withdrawal movement of the counter piston for filling the portioning chamber.

According to another embodiment of the device there is provided that the central angle referring to the axis of the rotor and comprising the area of the discharge opening of the housing is equal to or larger than the central angle also referring to the axis and including the circumference of the rotor between a trailing edge of the discharge opening of a piston and the leading edge of the subsequent piston. Thus, in each position of the rotor there is guaranteed an ejection proportional to the angle of rotation of the rotor.

According to a preferred embodiment the controlling cam is shaped as a circle involute, which, when seen under the aspects of manufacturing technique can be produced rather simply.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DESCRIPTION OF THE PREFERRED EMBODIMENTS

Figures 1, 2:
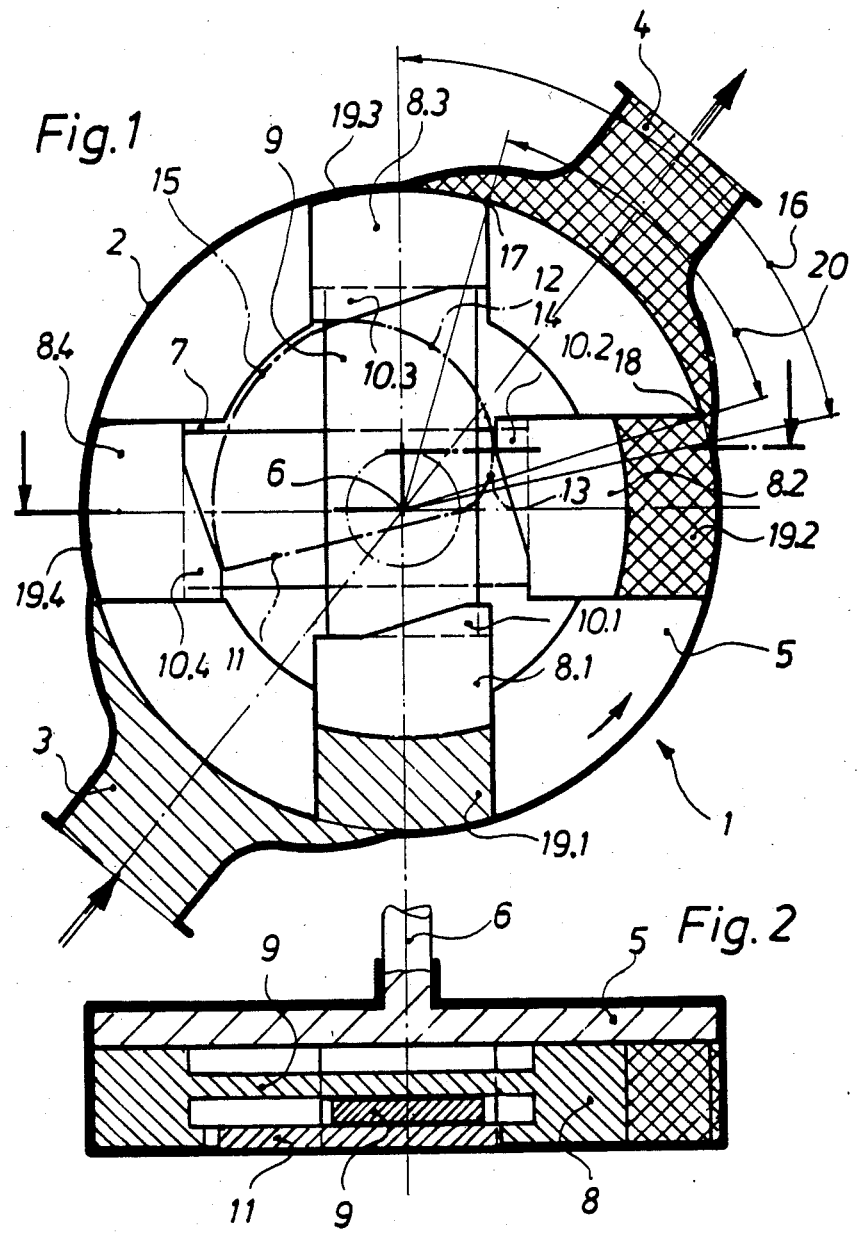
FIG. 1 shows a top view through a device according to the invention.
FIG. 2 shows a cross-section through the device of FIG. 1.

As shown in FIG. 1 a housing 2 of a conveyor 1 is provided with a supply opening 3 and a discharge opening 4 opposing the supply opening 3 centrally. The housing 2 surrounds a rotor 5 which is fitted in a self-sealing manner radially as well as axially and which is driven to rotate about an axis 6 in a suitable manner. The rotor 5 has recesses in the form of two grooves 7 of rectangular cross-section which extend centrally with their central axes and which intersect each other by an angle of 90°. The grooves 7 serve to receive two pairs of (displacer) pistons 8.1 to 8.4 fitted into the grooves 7 in an easy sliding fit and filling the cross-section of the grooves 7. The pistons of each pair are connected by connector shafts 9 being arranged to intersect in two different planes by mirror-inverted offsetting. The pistons 8.1–8.4 are provided with supporting cogs 10.1 to 10.4 which support against an inner controlling cam 11. This cam has a section formed as a (circle) involute 12 whose pitch circle centre coincides with the axis of the rotor 5. This section is composed by a starting portion 13 commencing on the periphery of the pitch circle, and an effective portion 14 including a rolling contact or roll-off angle of 90°, which effective portion 14 is followed by a guiding portion 15 extending concentrically to the pitch circle and extending over a central angle of 90°. The controlling cam 11 is arranged stationary with the housing. The supply opening 3 and the discharge opening 4 are arranged to expand in the manner of a chamber towards the rotor 5, their peripheral dimensions including a central angle 16 with respect to the axis 6. This angle 16 is preferably larger than a central angle 20 which is enclosed between a preceding and a trailing edge 17 resp. 18 of two neighbouring portioning chambers 19.1 and 19.2 resp. 19.3 and 19.4.

The functional phase shown in FIG. 1 may be regarded the basis for the consideration of the function:

Stuffing material preferably moving by slight super pressure through the supply opening 3 against the rotor 5 has, according to this representation, filled the portioning chamber 19.1 of the piston 8.1 facing downwardly in this figure and is positioned in front of the piston 8.4 just entered into the region of the supply opening 3 and arranged to the left hand of FIG. 1. When the rotor 5 is made to rotate in an counter-clockwise direction the right piston 8.2 composed with the left one via the connector shaft 9 to form a piston unit will be pushed towards the right by engagement of the supporting cog 10.2 with the effective portion 14 of the controlling cam 11. This effects the withdrawal of the left piston 8.4 with the consequence that the stuffing material can enter (float) into the increasing portioning chamber 19.4 thereof. During this process the piston 8.1 retains its radial position within the rotor 5 since in this phase of rotation the piston 8.3 connected with the piston 8.1 engages the controlling cam's 11 guiding portion 15 concentrical to the axis 6 with its supporting cog 10.3. After an angle of rotation of 90° the supporting cog 10.3 of the piston 8.3 has reached the transitional position between the effective portion 14 and the guiding portion 15, whereby the withdrawal movement of the piston 8.1 is ended. In the meanwhile the piston 8.1 has passed the region of the starting portion 13 of the controlling cam 11 with its supporting cog 10.1 and starts to climb up the effective portion 14 of the controlling cam 11. Since the corresponding piston 8.3 with its supporting cog 10.3 has reached the end of the guiding portion 15 of the controlling cam 11 at this moment (see position of the pistons 8.4/8.2 in FIG. 1) the ejection of the stuffing material from the portioning chamber 19.1 commences, which chamber in this position is already in connection with the region of the discharge opening 4. At the moment of the commencing of the ejection movement of the piston 8.1 the neighbouring preceding piston 8.2 has reached the transitional position between the effective portion 14 and the guiding portion 15 so that the ejection movement of this piston is ended.

If the rotor 5 is driven by means of a driving motor controllable with respect to its angle of rotation, then a signal which is proportional to the ejection volume may be derived with the described conveyor by means of a feed-back of the angle of rotation. Therefore it is possible with this device to produce equal portions by subsequent covering of equal angles of rotation. For this type of driving the use of a step motor has proved to be most appropriate.

What is claimed is:

1. A device for delivering portions of uniform weight and/or volume of a doughy substance, in particular sausage stuffing, the device comprising
   (a) a housing having a supply opening for supplying said substance to said housing and a discharge opening for discharging said substance from said housing,
   (b) a rotor fitting snugly within said housing and driven to rotate therein about an axis of rotation in a direction of rotation,
   (c) at least one pair of pistons arranged in said rotor and being movable by radial displacement in recesses in said rotor for taking up a defined volume of said substance in the region of said supply opening and for ejecting said volume in the region of said discharge opening during each cycle of said rotor, respectively, and
   (d) a stationary controlling cam for controlling said displacement of said pistons with the latter supporting against said controlling cam, wherein said controlling cam has a first section for controlling the ejecting movement of said pistons, at least this first section having a shape such that the ejection of said defined volume occurs proportionally to the angle of rotation of said rotor.

2. A device as claimed in claim 1, wherein said controlling cam has a second section for controlling a return movement of said pistons, said second section having a shape such that said return movement occurs increasing exponentially with respect to the angle of rotation of said rotor.

3. A device as claimed in claim 1, wherein two of said pistons each are arranged to oppose each other in pairs, said pistons of each of such pairs being connected rigidly with each other.

4. A device as claimed in claim 1, wherein a central angle whose apex lies in said axis of said rotor and which includes the area of said discharge opening of said housing is at least equal to a second central angle whose apex also lies in said axis and which includes the circumference of said rotor between a trailing edge of the recess of one of said pistons and a leading edge of the subsequent recess, when seen in said direction of rotation.

5. A device as claimed in claim 2, wherein a central angle whose apex lies in said axis of said rotor and which includes the area of said discharge opening of said housing is at least equal to a second central angle whose apex also lies in said axis and which includes the circumference of said rotor between a trailing edge of the recess of one of said pistons and a leading edge of the subsequent recess, when seen in said direction of rotation.

6. A device as claimed in claim 3, wherein a central angle whose apex lies in said axis of said rotor and which includes the area of said discharge opening of said housing is at least equal to a second central angle whose apex also lies in said axis and which includes the circumference of said rotor between a trailing edge of the recess of one of said pistons and a leading edge of the subsequent recess, when seen in said direction of rotation.

7. A device as claimed in claim 1, wherein said first section has the shape of an involute.

8. A device as claimed in claim 2, wherein said first section has the shape of an involute.

9. A device as claimed in claim 3, wherein said first section has the shape of an involute.

10. A device as claimed in claim 4, wherein said first section has the shape of an involute.

11. A device as claimed in claim 5, wherein said first section has the shape of an involute.

12. A device as claimed in claim 6, wherein said first section has the shape of an involute.

* * * * *